United States Patent [19]

Breveglieri

[11] Patent Number: 4,852,747
[45] Date of Patent: Aug. 1, 1989

[54] MULTIPLE TOOL HOLDER ASSEMBLY

[75] Inventor: Franklin L. Breveglieri, Spring Lake, Mich.

[73] Assignee: Geerpres, Inc., Muskegon, Mich.

[21] Appl. No.: 165,982

[22] Filed: Mar. 9, 1988

Related U.S. Application Data

[63] Continuation-in-part of Ser. No. 83,429, Aug. 10, 1987.

[51] Int. Cl.$^4$ .................................................. A47F 7/00
[52] U.S. Cl. .................................. 211/70.6; 211/60.1; 211/89; 248/110; 248/113
[58] Field of Search ........................ 248/110, 113, 111; 211/70.6, 89, 68, 60.1, 62, 64, 70.2, 70.8, 65, 67

[56] References Cited

U.S. PATENT DOCUMENTS

| | | |
|---|---|---|
| 120,818 | 11/1871 | Isham . |
| 458,332 | 8/1891 | Bulla . |
| 481,455 | 8/1892 | Worden .............................. 211/89 X |
| 489,678 | 1/1893 | Griffin . |
| 515,817 | 3/1894 | Burbank . |
| 867,199 | 9/1907 | Jack . |
| 994,790 | 6/1911 | Richards . |
| 1,139,595 | 5/1915 | Starr ................................. 211/65 X |
| 1,279,440 | 9/1918 | Reimer . |
| 1,309,125 | 7/1919 | Ford .................................. 211/65 X |
| 1,380,932 | 6/1921 | Shreve . |
| 1,393,265 | 10/1921 | Cooper .............................. 211/65 X |
| 1,414,541 | 5/1922 | Arey et al. ........................ 211/65 X |
| 1,444,874 | 2/1923 | Hahn . |
| 1,485,092 | 2/1924 | Rauchut . |
| 1,494,252 | 5/1924 | Kane . |
| 1,674,581 | 6/1928 | Webb ................................. 248/113 |
| 1,803,071 | 4/1931 | Poulin . |
| 1,908,554 | 5/1933 | Rauchut . |
| 2,518,289 | 8/1950 | Cox ................................... 211/60.1 |
| 2,723,762 | 11/1955 | Leiser ................................ 211/65 |
| 2,909,347 | 10/1959 | Bass . |
| 3,013,756 | 12/1961 | Boston . |
| 3,178,141 | 4/1965 | Bloom . |
| 3,294,350 | 12/1966 | Grottola . |
| 3,672,619 | 6/1972 | Bowen ............................... 248/113 |
| 4,134,499 | 12/1979 | Joswig ............................... 211/70.6 |

Primary Examiner—Ramon O. Ramirez
Attorney, Agent, or Firm—Harness, Dickey & Pierce

[57] ABSTRACT

An elongated squared-C channel extruded from a polymeric material carries one or more like-configured holding devices whereby different handled objects such as tools, brooms and the like may be hung vertically in side-by-side relation. The channel retains and allows selective positioning of the devices therealong and each device has fixed and movable gripping means which rely on gravity to produce a gripping force on the handle.

6 Claims, 1 Drawing Sheet

U.S. Patent      Aug. 1, 1989      4,852,747
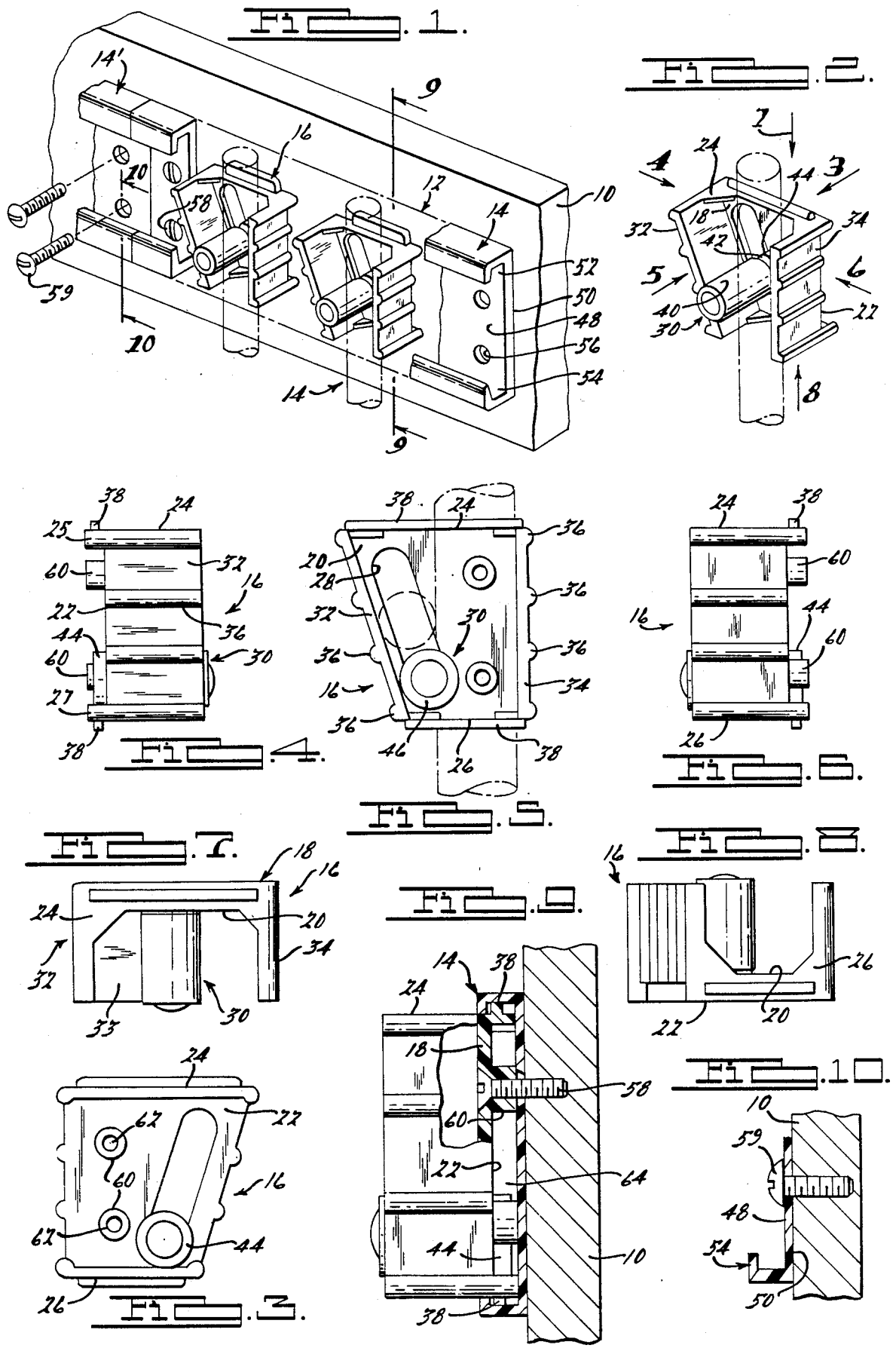

MULTIPLE TOOL HOLDER ASSEMBLY

CROSS-REFERENCE TO RELATED APPLICATION

This application is a continuation-in-part of copending application Ser. No. 83,429, filed Aug. 10, 1987.

BACKGROUND AND SUMMARY OF THE INVENTION

This invention relates to a gravity operated quick-release holding device for handled objects and more particularly to an article of manufacture for retaining one or more such holding devices whereby handled objects such as brooms, mops, tools and the like may be vertically supported on a wall in side-by-side relation.

A primary object of this invention is to provide a simple, practical and efficient article holder for use with handled objects. In this regard the holder would advantageously permit the handle to be quickly gripped and rapidly released by vertical movement of the handle relative to fixed and movable gripping means formed on the holder.

It is also an object to provide a support bracket extruded of a suitable polymeric material and configured both to interconnect with other like brackets to form a continuous support surface as needed and to interengage with each of the holding devices to allow their being moved relative to the bracket.

Another object is to provide an arrangement which spaces each holding device from the support bracket so as to define a space within which a rotatably journalled end of handle gripping shaft may rotate and move and which cooperates with a securement member to form a stop for preventing the holding device from being inadvertently removed from the bracket. A fastener member may be used in the arrangement either to secure the support bracket without impeding movement of the holding device, to hold both the holding device and the bracket or to form an abutment which can engage the holding device to prevent its lateral movement.

The foregoing and other objects and attendant advantages will become more apparent when viewed in light of the accompanying drawings and following detailed description wherein:

BRIEF DESCRIPTION OF THE DRAWINGS

FIG. 1 is a perspective view of an article of manufacture for selectively positioning and holding handled objects in side-by-side relation including a support bracket retaining several quick-release handle holding devices;

FIG. 2 is a perspective view of one holding device gripping a handle object shown in phantom;

FIG. 3 is a rear view of the holding device taken in the direction of arrow 3 in FIG. 2;

FIG. 4 is one side elevation view of the binding device taken in the direction of arrow 4 in FIG. 2;

FIG. 5 is a front view of the holding device taken in the direction of arrow 5 in FIG. 2;

FIG. 6 is the other side elevation view of the holding device taken in the direction of arrow 6 in FIG. 2;

FIG. 7 is a top plan view looking down at the holding device taken in the direction of arrow 7 in FIG. 2;

FIG. 8 is a bottom plan view looking up at the holding device taken in the direction of arrow 8 in FIG. 2;

FIG. 9 is an end elevation view, partially in section, taken along line 9—9 of FIG. 1 showing the support bracket mounted to a wall and retaining a holding device; and FIG. 10 is an end elevation view in section taken along line 10—10 of FIG. 1 of the bracket secured to the wall.

DETAILED DESCRIPTION OF THE PREFERRED EMBODIMENT

Turning now to the drawings, an article of manufacture for releasably holding the elongated handles of brooms, mops, tools and like objects on a wall 10 and in a vertical upright position is indicated by the number 12. The article includes an elongated support bracket 14 configured such that one or more object holding devices 16 can move laterally of the bracket, the bracket being mounted on a substantially vertical wall at a location from the floor of a workplace and oriented to extend in a horizontal direction (i.e., generally parallel) to the floor. The holding device 16 is adapted to permit an elongated handle H to be quickly and easily inserted and removed therefrom for use. As shown support brackets 14 and 14' have their adjacent ends abutted to form a continuous support surface. Additional brackets could be abutted as needed.

In accordance with the invention, holding device 16 is integrally formed of a polymeric material into a U-shaped frame nd comprises a flat base member 18 having top and bottom surfaces 20 and 22, upper and lower surfaces 24 and 26, and an inclined slot 28 extending between the top and bottom surfaces, a cylindrical shaft 30 rollably journalled for rotation and vertical movement in the slot and a pair of generally flat wall members 32 and 34 each upstanding generally perpendicularly from opposite lateral edges of the base member to define a V-shaped throat. When the holding device 16 is mounted to the bracket, the top and bottom surfaces 20 and 22 are each in a plane generally parallel to the support bracket, the upper and lower surfaces 24 and 26 are in a plane generally parallel (i.e. horizontal) to the floor, wall member 34 is in a plane generally perpendicular to the floor, and wall member 32 is in a plane inclined at an acute angle to the floor, each wall member having reinforcing ribs 36 to resist their deflection from the U-shape. A flange 38 extends along and upwardly from the upper and lower surfaces, respectively, of wall member 18, each flange being suitably sized to be snugly received in the support bracket. Flanges 25 and 27 extend rearwardly from surface 22 of base member 18 and form continuations of surfaces 24 and 26.

The roller shaft 30 has its axis generally perpendicular to base member 18 and includes a first portion 40 disposed adjacent to inclined wall member 28, a reduced second portion 42 disposed in the slot, and a cylindrical head portion 44 extending rearwardly from surface 22 of the base to retain the shaft in the slot. A cylindrical body 46 of a durable elastomer such as rubber encloses first portion 40 of shaft 30 to grippingly engage the handle. The weight of the shaft is such that gravity always pulls the shaft to the bottom of the slot 28.

Wall member 34 and shaft 30 define fixed and movable gripping members extending from the base member, the shaft defining a movable gripping member supported in slot 28 for vertical movement toward and away from the fixed gripping member 34 in a direction inclined thereto so as to produce a gripping force on the handle H of the object placed therebetween. Wall member 32 has a surface 33 and defines a fixed gripping member in that the rubber annulus 46 bears against the inclined surface during vertical rolling movement to resist lateral forces acting on shaft 30 by the handle H from affecting the connection afforded by the head portion 44 and assures that a good gripping force is transmitted against the handle H in cooperation with the other wall member 34.

The support bracket 14 is extruded from a polymeric material into a squared-C cross-section to define generally planar, parallel, top and bottom surfaces 48 and 50 and an upper and a lower channel 52 and 54 each channel sized to receive one flange 38 extending, respectively, from the upper and lower surfaces of base member 18. Preferably the material is extruded vinyl. Adjacent each end of the bracket are provided one or more through holes 56 each having a chamfered entry and sized to receive a fastener 58 (or suitable securing member) for securing the bracket to the vertical wall 10. The channels 52 and 54 snugly interengage with the flanges to retain but allow the holding device to be selectively positioned at horizontal positions defined by the mounted bracket.

In accordance with this invention cylindrical bosses 60 are integrally formed with the base member 18 each boss being provided with a central bore 62 to receive fastener 58. Advantageously, the bosses 60 can be used as a stop member and as a means with flanges 25 and 27 to define a space 64 between top surface 48 of the bracket and the back surface 22 of the base member. The space 64 advantageously allows the cylindrical head portion 44 of the shaft 30 to rotate and move freely relative to the slot.

A fastener such as a flat headed screw 58 or round headed screw 59 can be used to immovably secure the holding devices 16 relative to the wall (See FIG. 9). In this aspect, the bores 62 will preferably register with the holes 56 in the brackets. Further, if the flat headed screw 58 is used to secure the bracket to the wall then the chamfer in the bracket holes 56 will allow the bosses 60 of the holding device to pass. However, if a round headed screw 59 is used the head thereof will abut a boss and prevent passage of the device (See FIG. 10).

In use, a handle H would be positioned adjacent surface 26 of holding device 16 and inserted axially upward between wall members 32 and 34 causing shaft 30 to be driven upwardly to accommodate the handle width. A frictional gripping force resists unwanted downward movement of the handle. When the handled object is needed, the user forces the handle axially upward and outward from the members, upward movement also causing upward vertical movement of the roller. Thereafter, the roller falls downwardly in slot 28 and ready for use.

While it will be apparent that the preferred embodiment of the invention disclosed in well calculated to provide the advantages and features above stated, it will be appreicated that the invention is susceptible to modification, variation and change without departing from the proper scope or fair meaning of the subjoined claims.

I claim:

1. An article of manufacture for releasably holding handled objects, characterized by an elongated support bracket adapted to be horizontally mounted on a substantially vertical wall, said support bracket is extruded from a polymeric material into a squared-C cross-section to define a pair of horizontally extending channels each sized to receive a respective flange extending from opposite edges of a base member, an object holding device comprising a base member having an inclined slot, fixed and movable gripping means extending from said base member for producing a gripping force on the handle of said object when placed between said fixed and movable means, and spacer means for spacing the base member from the support bracket, said movable gripping means being supported and rotatable in said slot to produce a gravity operated movement toward and away from said fixed gripping means in a direction inclined to the fixed gripping means, said movable gripping means comprising a cylndrical shaft journalled in said slot and having an end portion in the space defined by the spacer means, flanges on said base member to retain and permit the holding device to be selectively positioned at any desired horizontal position defined by the mounted bracket, stop means for preventing the object holding device from being inadvertently removed from said support bracket, said stop means including fastener means extending through the spacer means and the support bracket for immovably fastening the object holding device to the wall, a second fixed gripping means cooperating with said movable gripping means for enhancing the gripping force on the handle, the first and second gripping means including first and second wall members each extending generally perpendicularly from the base member and the support bracket, the second wall member defining a plane inclined at the same angle as the slot to provide support for the movable gripping means, said first and second wall members each including one or more exterior ribs, said exterior ribs providing reinforcement to said first and second wall members.

2. The article as recited in claim 1 wherein said support bracket is comprised of a plurality of like-sectioned support bracket portions having their ends abutted.

3. The article as recited in claim 1 wherein a plurality of holding devices are retained by the support bracket whereby to hold a respective plurality of elongated handles in side-by-side relation.

4. The article as recited in claim 1 wherein said support bracket has planar top and bottom surfaces the bottom surface being abutted against the wall, and said stop means includes said support bracket being secured to said wall by a fastener having a head portion which projects upwardly from the top surface of the support bracket whereby to form an abutment which will engage the holding device to prevent its movement.

5. A multiple tool holder assembly characterized by a horizontally extending support channel, said support channel is extruded from a polymeric material into a squared-C cross-section to define a pair of horizontally extending channels each sized to receive a respective flange extending from opposite edges of a base member, a plurality of separate quick-release tool holders disposed in said channel each being movable independently of the other holders and adapted to releasably retain the handle of one tool, each said tool holder comprising a generally U-shaped body including a first and second wall member upstanding from a base member, spacer means for spacing the base member from the channel whereby to define a space therebetween, said separate tool holder is integrally molded from a polymeric material and includes said spacer means integrally formed to said base member, stop means for preventing the tool holders from being inadvertently removed from said support channel, said stop means including fastener means extending through the spacer means and the support channel for immovably fastening the support channel to a wall, and a gravity operated roller having opposite end portions one end portion being journaled for rotation in said space and the other end portion being disposed adjacent one wall member for vertical movement towards and away from the other wall member to grip a tool handle inserted between the wall members, said wall members each including one or more exterior ribs, said exterior ribs providing reinforcement to said wall members.

6. The tool holder as recited in claim 5 wherein said flange extending from opposite vertical edges of said base member each flange being positioned relative to the bracket by the spacers and sized to fit snugly in a respective channel.

* * * * *